April 11, 1967  C. E. GINGHER  3,313,424
CLOTHES HANGER SUSPENSION DEVICE
Filed Sept. 23, 1966  6 Sheets-Sheet 1
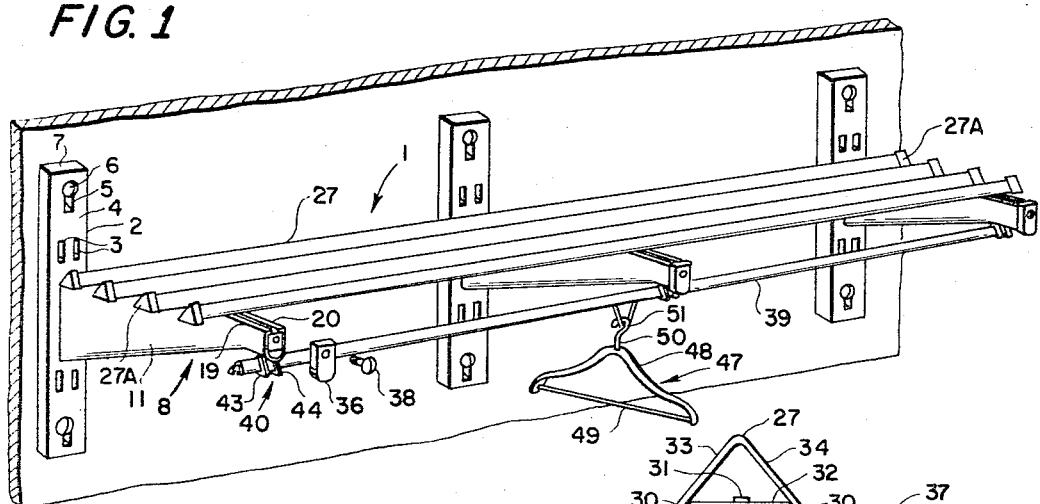
FIG. 1
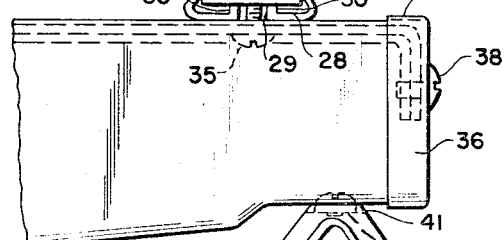
FIG. 2
FIG. 3
INVENTOR
CARL E. GINGHER
BY Edmund M. Jaskiewicz
ATTORNEY April 11, 1967 C. E. GINGHER 3,313,424
CLOTHES HANGER SUSPENSION DEVICE
Filed Sept. 23, 1966 6 Sheets-Sheet 2
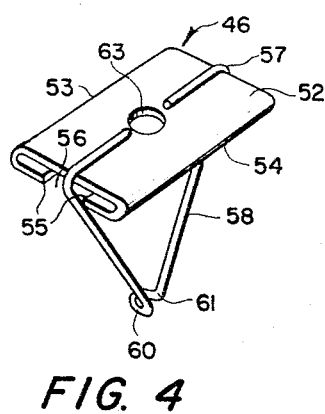
FIG. 4
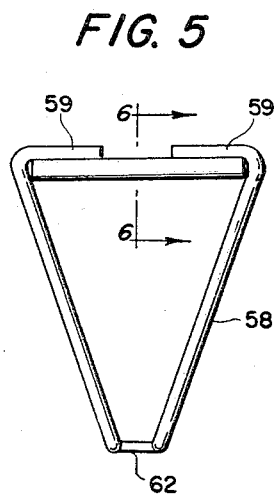
FIG. 5
FIG. 7A
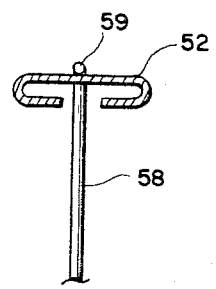
FIG. 6
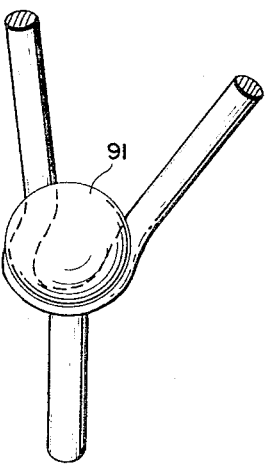
FIG. 7B
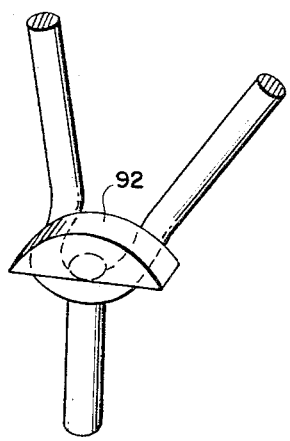
INVENTOR
CARL E. GINGHER
BY Edmund M. Jaskiewicz
ATTORNEY April 11, 1967   C. E. GINGHER   3,313,424
CLOTHES HANGER SUSPENSION DEVICE
Filed Sept. 23, 1966   6 Sheets-Sheet 3

INVENTOR
CARL E. GINGHER

BY Edmund M. Jaskiewicz
ATTORNEY

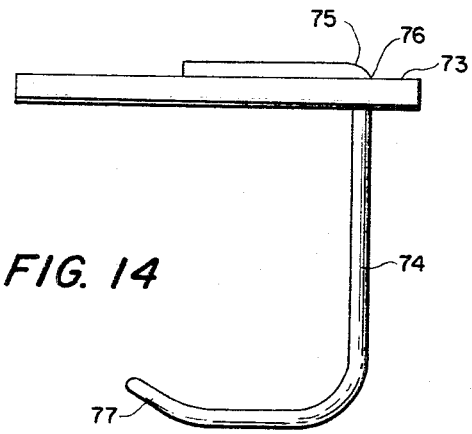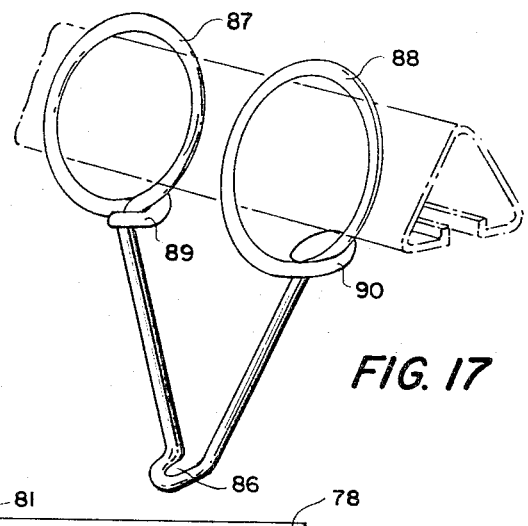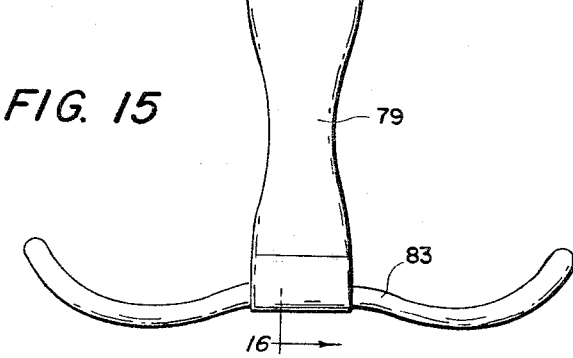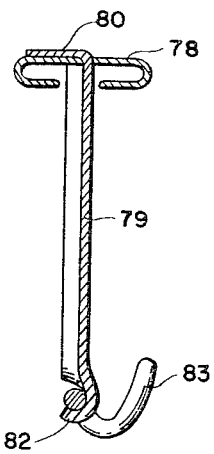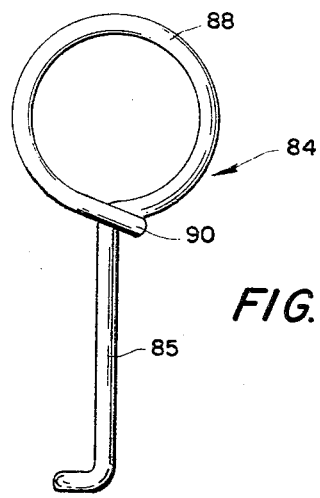

April 11, 1967  C. E. GINGHER  3,313,424
CLOTHES HANGER SUSPENSION DEVICE
Filed Sept. 23, 1966  6 Sheets-Sheet 5

INVENTOR
CARL E. GINGHER
BY Edmund M. Jaskiewicz
ATTORNEY

April 11, 1967  C. E. GINGHER  3,313,424
CLOTHES HANGER SUSPENSION DEVICE
Filed Sept. 23, 1966  6 Sheets-Sheet 6

INVENTOR
CARL E. GINGHER
BY Edmund M. Jaskiewicz
ATTORNEY

United States Patent Office 3,313,424
Patented Apr. 11, 1967

3,313,424
CLOTHES HANGER SUSPENSION DEVICE
Carl E. Gingher, 304-328 Depot St.,
Scranton, Pa. 18509
Filed Sept. 23, 1966, Ser. No. 581,628
19 Claims. (Cl. 211—113)

The present application is a continuation-in-part application of the copending application Ser. No. 395,705, filed Sept. 11, 1964, now U.S. Patent 3,288,308 granted Nov. 29, 1966, by the same named inventor.

The present invention relates to a wall mounted rack having shelves formed of spaced bars and an arrangement for hanging clothes hangers therefrom, more particularly, to a suspension device for clothes hangers which is slidably mounted in a track carried by the wall mounted track.

In many types of buildings where large numbers of people gather, such as in schools, factories, industrial plants, offices and the like, it is desirable to provide a simple wall rack of great strength which has a shelf structure for supporting personal belongings and a suspension arrangement upon which garments, such as coats, may be hung. The basic function performed by such wall mounted racks is to support personal belongings and garments in an orderly manner. Thus, such a rack should have minimum inherent strength properties sufficient to perform these functions effectively. It has been found, however, that in many instances such wall-mounted racks have been badly damaged by persons who may grasp portions of the rack to swing on them or for other purposes. It has been particularly found that in the schools the younger people tend to use the racks to chin themselves in order to demonstrate to themselves and others their strength. Accordingly, such wall-mounted racks as were installed in schools required considerable expenses for maintaining them in proper condition and in many cases it was necessary to replace the racks completely after short periods of time.

Such wall racks are usually installed by mounting them upon a long wall surface such as in a corridor or one side of a large enclosed space as might be found in an industrial plant. When such racks are fixedly mounted upon the wall, they conformed to the variations of the wall surface from a vertical plane. In the construction of such building walls, the average run-out is only about $\frac{3}{16}''$. However, wall mounted racks would tend to magnify this run-out and when a person stood at one end of the racks and looked along the line of racks upon the surface of the wall, the deviations of the wall from the vertical were greatly magnified. As a result, construction of the building was unjustly criticized and in several instances, actually condemned. As far as is known, no such wall-mounted racks comprising a shelf and a garment suspending structure have been constructed which are readily adjustable after the installation of the racks in order to compensate for any deviations in the wall surfaces and to align the racks.

Not only must such a wall-mounted rack be readily adjustable and have great strength but it should also be simple to assemble and install on site and should be relatively inexpensive.

For application on such wall-mounted racks and in other general applications, various arrangements have been devised for supporting clothes hangers. Clothes hangers are conventionally supported by a hook upstanding therefrom with the hook being positioned over a rod or bar. Where individual suspension devices for each clothes hanger are desired, the suspension devices have various forms of loops or openings formed thereon in order to receive the clothes hanger hook. Such suspension devices have also been constructed with specially formed receptacle portions to receive a particular type of a hanger means such as an enlarged or T-head on the end of a stem upstanding from a hanger. Thus, hangers with various types of hook or head arrangements thereon were not interchangeable between the various suspension devices but a particular type of suspension device would have to be provided for each type of hanger supporting arrangement.

It is the principal object of the present invention to provide a novel and improved clothes hanger suspension device.

It is another object of the present invention to provide a wall-mounted rack structure having a shelf formed of spaced bars and a garment suspending arrangement.

It is yet another object of the present invention to provide a clothes hanger suspension device which is slidably mounted in a track and which can receive clothes hangers having hanger hooks and the T-type and ball-type hanger hooks.

It is still another object of the present invention to provide a track structure for slidably carrying a clothes hanger suspension device which is of great strength and can be readily fabricated from relatively inexpensive material.

It is still a further object to provide a novel and improved clothes hanger suspension device for slidable movement in a track.

It is still an additional object of the present invention to provide a novel and improved arrangement of a track and a clothes hanger suspension device slidably carried therein.

The objects of the present invention are achieved and the disadvantages of the prior art are eliminated by the wall-mounted rack of the present invention. This rack essentially comprises a plurality of brackets which are mounted upon a wall and are vertically adjustable thereon. A supporting bracket is mounted on each wall bracket to support a plurality of spaced bars or rods which define a shelf. Slidably carried within the supporting brackets are adjusting slides to which the spaced bars are attached. The position of the slides may be varied with respect to the wall so as to adjust the distances of the bars from the wall but to maintain the bars in fixed spaced relationship to each other. Enclosing the ends of each supporting bracket is an end cap which is attached to the end of the adjustable slide within each supporting bracket.

The shelf bars comprise hollow tubular members which have a triangular cross-section and a longitudinally extending slot in one side thereof. The edges of the slot are bent inwardly toward the center of the rod to define a track upon which a clothes hanger suspension device may be slidably mounted. The use of the triangularly shaped rods to form the shelf results in a wall-mounted bar rack which is of tremendous strength. Tests have indicated that the wall rack of this invention is from 300% to 900% stronger than any similar racks currently on the market. This is an outstanding advantage since tests have shown that one of the leading causes of damage to such racks, particularly when installed in schools, is the use of such racks as chinning bars by students.

The use of such tubular members results in an overall lower material cost since it is not necessary to perform a seam welding operation on the shelf bars. It is therefore feasible to utilize heavier gauge steels to form these tubular members than would be the case if it were necessary to seam-weld the shelf bars. It is estimated that even using heavier gauge steel but eliminating seam welding the wall rack of this invention can be sold for approximately two-thirds of the cost of any similar rack now on the market.

A clothes hanger bar which is similar to the tubular shelf rods may be mounted on the underside of the supporting brackets. Such a hanger bar may be mounted with the slotted slide upwardly so that clothes hanger hooks may be placed over the bar. When hooks are positioned over the hanger bar, they will be supported at two points, i.e., the edges of the top face of the triangular bar. Accordingly, the plurality of clothes hangers suspended on such a hanger bar will position themselves so that the hangers are all parallel to each other.

The triangular section hanger bar may also be attached to the ends of the supporting brackets by adapters so that the slotted face of the hanger is directed downwardly. In this position, clothes hangers suspension devices are slidably mounted within the triangular hanger bar. The base of the suspension device which is within the hanger bar is provided with a groove in the lower face thereof which groove receives the tracks defined by the upturned edges of the hanger bar slot.

The clothes hanger suspension device essentially comprises a rod-like member bent into the form of a V with the lower or apex end of the V being bent rearwardly at substantially right angles to the remainder of the V. This provides a universal suspension arrangement which can easily accommodate clothes hanger hooks or enlarged, T-shaped or ball heads on stems upstanding from clothes hanger. Thus, with the clothes hanger suspension device of this invention, it is not necessary to provide adapters to accommodate the different types of supports for clothes hangers which are on the market today.

In one modification of the clothes hanger suspension device the portions of the rod-like member immediately above the right angle bend therein are parallel. These parallel vertical portions prevent rotating of T-shaped stems for hangers and also hold the T stem and ball top stem more securely since the hanger must be raised higher before it is released from the horizontal slot formed by the apex of the V-shaped rod-like member.

Several additional modifications of the clothes hanger suspension device are also disclosed herein.

Other objects and advantages of the present invention will be apparent from the accompanying description when taken in conjunction with the following drawings, wherein:

FIGURE 1 is an overall perspective view of a wall-mounted rack incorporating the clothes hanger suspension device of the present invention;

FIGURE 2 is a side elevational view of the front portion of the rack of FIGURE 1;

FIGURE 3 is a vertical sectional view through a wall bracket and corresponding supporting bracket of the rack of FIGURE 1;

FIGURE 4 is an overall perspective view of a clothes hanger suspension device of the present invention;

FIGURE 5 is a front elevational view of the suspension device shown in FIGURE 4;

FIGURE 6 is a sectional view taken along the line 6—6 of FIGURE 5;

FIGURES 7A and 7B show a ball head and T-head on stems of a clothes hanger positioned in the suspension device of FIGURE 4;

FIGURE 14 is a front elevational view of still another suspension device modification;

FIGURE 15 is a front elevational view of an additional suspension device modification;

FIGURE 16 is a sectional view taken along the lines 16—16 of FIGURE 15;

FIGURE 17 is a perspective view of the suspension device of the present invention modified so as to be slidably mounted upon a bar or rod;

FIGURE 18 is a side elevational view of the modified suspension device of FIGURE 17;

Proceeding next to the drawings wherein like reference symbols indicate the same parts throughout the various views, a specific embodiment and several modifications of the present invention will be described in detail.

Figure 8:
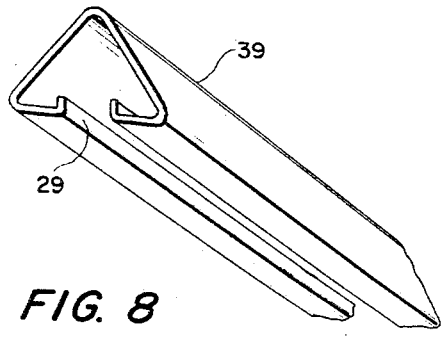
FIGURE 8 is a perspective view looking upwardly at a triangular tubular member track in the wall mounted rack of FIGURE 1.

The wall-mounted bar rack of the present invention is indicated generally at 1 in FIGURE 1. The rack comprises a plurality of wall brackets 2 each of which has a channel cross-section with a plurality of pairs of slots 3 in the web 4 thereof. In the ends of the bracket webs 4 are slots 5 through which are passed bolts 6 to secure the bracket to the wall. The slot and bolt arrangement 5 and 6 enables the wall brackets to be adjusted vertically on the wall. The ends of the channel wall bracket webs 4 are bent over at 7 so as to close the ends of the brackets. The brackets may be made in various lengths so as to accommodate a plurality of vertically spaced shelves or to mount the shelves at different heights with respect to the floor to accommodate increasing heights of growing children.

Mounted on each wall bracket is a supporting bracket indicated generally at 8 and illustrated in greater detail in FIGURE 3. The bracket 8 is formed of cold-rolled sheet steel which has an inherent resilience and is bent in substantially a U-shaped cross-section and in the shape of a right triangle. The bend which forms the lower end of the U-shaped cross-section comprises the hypotenuse of the triangle as indicated at 9. In forming the bracket 8 the cross section of the bracket actually tapers outwardly from the bent side 9 so that the legs of the U-shaped cross-section are not parallel to each other prior to assembly of the bracket.

A backing piece 10 is spot-welded to each inner face of the bracket sides 11 and 12 adjacent the long end thereof. There are a plurality of pairs of projections 13 extending outwardly from each of the backing pieces 10.

Each projection has a notch 14 on the underside thereof adjacent the edge of the bracket and is of a width sufficient to accommodate the sheet steel from which the wall brackets 2 are formed. There are aligned openings 15 in the bracket sides 11 and 12 adjacent the shorter leg of the bracket. A nut and bolt assembly indicated at 15A in FIGURE 3 may be passed through this pair of aligned holes and tightened to urge the faces of the bracket together to lock the projections 13 of the supporting bracket within the slots of the wall bracket.

As may be seen in FIGURE 3 the underside of the forward end of the bracket 8 has a flattened portion 16 with an opening 16A therein to receive a bolt 17. There are a plurality of openings 18 spaced along the bend 9. The upper edges of the supporting bracket sides 11 and 12 are bent inwardly to form flanges 19 and 20.

Positioned within each supporting bracket 8 against the inner flanges 19 and 20 is an adjustable slide 21 as illustrated in FIGURE 3. The slide 21 has a channel cross-section with a plurality of spaced openings 22 in the web 23 thereof. The outer end of the channel is bent downwardly at right angles to form a bent portion 24 having a threaded opening 25 therein. There is a slot 26 in the web 23 adjacent the bent portion 24.

Supported on the upper edges of the supporting brackets 8 and attached to the adjustable slides therein are a plurality of spaced bars 27 which are parallel to the wall upon which the rack is mounted to define a shelf. The bars 27 are hollow and have a cross-section which defines an equilateral triangle. The open ends of the bars are closed by caps 27A tightly fitted thereon. One face 28 of the bar has a longitudinally extending slot 29 therein. The edges of the slot are bent inwardly at 30 so as to define a track. The bars 27 are formed from sheet steel of a suitable guage with no seam welding being necessary in the fabrication of this bar. The resulting triangular bar with the slot therein has considerable strength. Even by using a somewhat heavier gauge sheet steel than would be employed in a seam welded bar the triangular bar of the present invention is considerably cheaper to make than would be the case if it were necessary to perform a seam welding operation on the bar.

The shelf bars 27 are secured to the upper edges of the supporting brackets 8 by flat or rounded head bolts 31 passed upwardly through selected openings 22 in the adjustable slide adapter 21 and extending into the slot 29 of a particular bar. An elongated nut or lug 32 is sufficiently long so that the ends thereof will engage the faces 33 and 34 of the bar whereby the nut is prevented from rotating within the bar. Access to the head 35 of the bolt 31 is provided by inserting a screw driver up through an opening 18 in the lower edge 9 of the supporting bracket.

An end cap 36 which has a flange 37 extending around its entire periphery fits closely over the forward open end of the supporting bracket. The end cap is secured to the bent end 24 of the slide 21 by a screw 38.

In the rack installation illustrated in FIGURE 1 there is mounted on the lower edge of the supporting brackets and adjacent the outer end thereof a hanger bar 39 with its slotted face positioned downwardly. To mount the hanger bar in this position there is provided an adapter 40 which may be seen in FIGURE 2. The adapter 40 has a base portion 41 which is of considerable thickness so as to have a threaded opening 42 therein. Depending from opposed sides of the base 41 are legs 43 and 44 each of which has a triangular opening 45 therein to conform to the shape of the triangular bar 27 so that such a bar may be snugly received therein.

The adapter 40 is secured to the flattened portion 16 on the forward end of the supporting bracket 8 by positioning the base 41 of the adapter against the flattened portion 16 and threading a bolt 17 downwardly through the opening 16A, into threaded engagement with the adapter opening 42. Access to the head of the bolt 17 may be through the slot 26 in the slide 21 or, in the absence of the slide, between the flanges 19 and 20 on the upper edge of the supporting bracket.

With the adapters 40 in position, a hanger bar 39 may then be placed therein as may be seen in FIGURES 1 and 2 of the drawings.

As may be seen in FIGURE 1 the hanger bar 39 is utilized as a track in which are slidably carried a plurality of clothes hangers suspension devices 46 as illustrated in FIGURES 2 and 4.

Each suspension device 46 may have suspended therefrom a clothes hanger indicated generally at 47 and comprising a curved shoulder bar 48 having a cross bar 49 secured between the ends thereof. Upstanding from the mid-portion of the shoulder bar 48 is a shank or stem 50 having a hook 51 extending therefrom. The hook functions as the support means for the clothes hanger.

Figure 9:
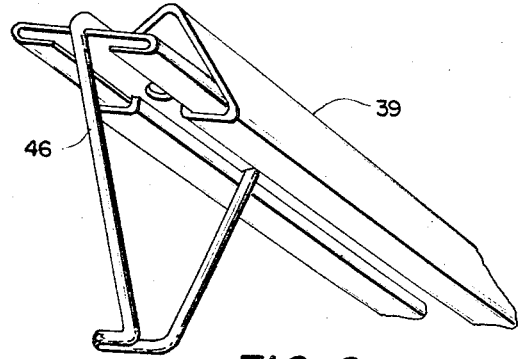
FIGURE 9 is a perspective view looking upwardly at the track of FIGURE 8 and further showing a suspension device positioned thereon.

The operating relationship between the suspension device 46 and the track 39 is clearly illustrated in FIGURE 9.

The suspension device 46 comprises a base 52 formed of a rectangular piece of metal with opposed edges thereof being bent inwardly at 53 and 54 to form spaced apart channels with the terminal edges 55 of the channels defining therebetween a slot 56. The slot 56 receives the track portions 30 of the bar 27.

To form the support for the hanger a single rod-like member 57 is bent to form a V portion 58 with the ends of the rod 59 being bent over into engagement with the top surface of the base 52 and welded thereto. The end or apex 60 of the V is curved and then bent rearwardly at 61 at a right angle to the V portion 58 to define a slot 62. The V portion 58 is substantially at right angles to the base 52. An opening 63 is formed within the base 52 to accommodate a locking nut if it is desired that the suspension device 46 be locked in position within the hanger bar 39.

As may be seen in FIGURE 2 the presence of the slidable suspension device 46 within the hanger bar 39 adds considerable strength to the bar. The edges 53 and 54 of the suspension device base 46 engage the inner faces of the triangular bar and thus prevent the triangular bar from closing so as to narrow the slot 29 therein. In addition, the terminal edges 55 of the suspension device base 46 engage the flanges 30 of the triangular bar slot 29 so as to prevent opening or spreading of this slot.

In FIGURES 7A and 7B there is illustrated the manner in which a ball head support 91 of a clothes hanger and the T type head 92 are supported within the suspension device of the present invention. The ball type and T type heads are usually used on clothes hangers to prevent the use of such hangers except on special adapters attached permanently on hanger bars. In either event the wide V shaped portion 58 facilitates insertion of either the hanger hook or the ball or T heads into the slot 62 at the apex of the suspension device 46.

It is pointed out that the suspension device 46 of the present invention has the slot 62 in the apex facing to the front of the rack so that the person desiring to position a clothes hanger on the suspension device has full visibility of the suspension device. This is a great advantage when compared with previous suspension devices wherein access to the slotted opening was from the sides and, accordingly, difficulty was encountered in either positioning or removing a clothes hanger from such prior art suspension devices, particularly when many garments were closely packed upon suspension devices. Further, while the slot 62 in the apex of the suspension device is only slightly wider than the diameter of the stem upstanding from the clothes hanger, the V-shaped portion 58 forms a guide to the slot to facilitate the hanging of clothes hangers thereon. Thus while the actual supporting of the hanger hook is in the narrow slot 62 in the apex, positioning of the hanger hook is considerably facilitated by the V portion 58 which guides the hook to the slot 62.

Figure 10:
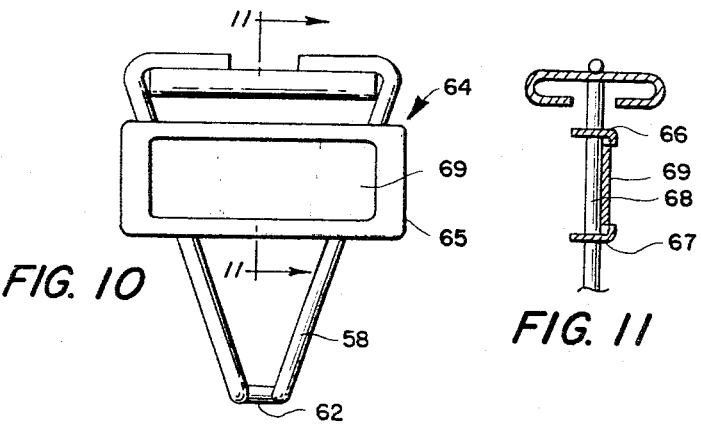
FIGURE 10 is a front elevational view of a suspension device similar to that of FIGURE 4, but having a holder thereon for identification cards or numbers.
Figure 11:
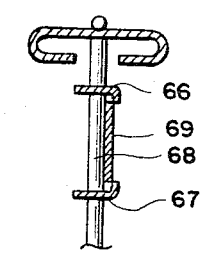
FIGURE 11 is a sectional view taken along the line 11—11 of FIGURE 10.

In FIGURES 10 and 11, there is shown a modification wherein the suspension device of FIGURE 4 is provided with an identification holder indicated generally at 64. The holder comprises a frame 65 which is welded onto the front of the V-shaped portion 58. The frame 65 has top and bottom flanges 66 and 67 which are provided with slots therein to receive the legs defining the V-portion 58. A recess portion 63 is spaced behind the front face of the frame 65 to accommodate identification cards 69. The identification cards may be a number of small cards, as indicated in FIGURE 10, with each having a numeral thereon or may comprise a single large card bearing a name or some other form of identification. The holder 64 enables the identification means to be interchanged or removed as may be desired. It is pointed out that the frame 65 of the identification holder is substantially the same length as the width of the suspension device as can be seen in FIGURE 10. Accordingly, when a plurality of suspension devices are positioned adjacent each other in the track, the identification holders 64 will be in alignment and will present a continuous line.

Figure 13:
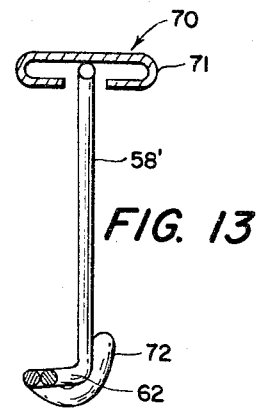
FIGURE 13 is a side elevational view of the suspension device modification shown in FIGURE 12.
Figure 12:
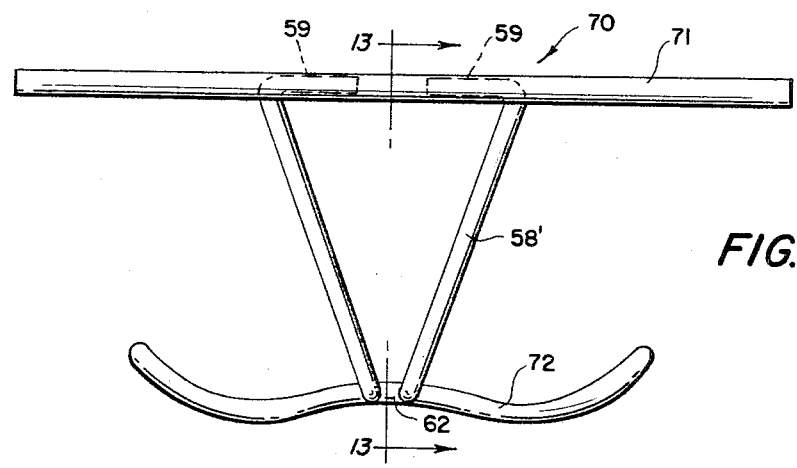
FIGURE 12 is a front elevational view of another modification of the suspension device.

Proceeding next to FIGURES 12 and 13, there is shown another modified suspension device having both a V guide and slot for clothes hangers and a double hook for garments. This modified suspension device indicated generally at 70 comprises a base 71 which has the same section as the base 52 of the suspension device of FIGURE 4 but is somewhat longer. Accordingly, the ends 59 of the V-shaped portion 58' are spot-welded to the inner face of the base 71 as may be seen in FIGURE 13. The increased length of the base is necessary since the suspension device may support a coat on only one side and hence be considerably out of balance. On the tip of the apex 60 there is spot-welded a double coat hook indicated at 72. Thus, not only can this modification support clothes hangers having different types of supporting members but can also carry two or more garments on the ends of the double coat hook.

In a further modification of FIGURE 14, the base indicated at 73 has the same cross-section as the base 52 of the suspension device of FIGURE 4, but is made slightly longer. A single coat hook is formed from a wire or rod 74 with the upper end being bent at 75 at substantially right angles after being passed through an opening 76 in the base. The upper end is then spot-welded to the top surface of the base 73. The lower end of the rod 74 is bent to form a garment hook 77.

Proceeding next to FIGURES 15 and 16, there is shown still another modification of the suspension device which is provided with a double coat hook. This modification similarly comprises a base 78 which is similar to the base 71 of the modification of FIGURE 12. Projecting downwardly from the base 78 is an arm 79 having a channel cross-section with one end 80 being inserted through an opening 81 in the base 78 and bent over as shown in FIGURE 16 to be welded to the upper surface of the base 78. The lower end 82 of the bracket 79 is bent around a double coat hook 83 and welded thereto. Thus, this modified suspension device can be utilized with the track of FIGURE 8 but is not provided with a V-shaped holder for a clothes hanger hook.

In FIGURES 17 and 18 there is provided another modified form of suspension device which can be slidably mounted on any shape of hanger bar. This suspension device is indicated generally at 84 and comprises a V-shaped portion 85 which is similar to the V-shaped portion 58 of the suspension device of FIGURE 4. The apex of the V-shaped portion 85 is similarly shaped to define a slot 86 for receiving a clothes hanger supporting member.

The upper ends of the legs of the V-shaped portion 85 are formed into circular loops 87 and 88 with the extreme portions of the rods being bent around the upper ends of the V-shaped portions as indicated at 89 and 90. The suspension device 84 is thus similar to the suspension device 46 of FIGURE 4 but it can be slidably mounted upon hanger bars having circular, square, triangular or other cross-sections. Thus, this suspension device 84 is truly universal since it not only can support every known type of hanger supporting member but can also be slidably mounted upon various shaped bars. The loops 87 and 88 can be made into any desired size so as to accommodate various diameters of hanger bars.

In FIGURES 19 through 24 there is shown still another modification of the clothes hanger suspension device which more securely holds the hook, the T-head, or ball stem of a clothes hanger. This modified suspension device essentially comprises a horizontally disposed base member and a V-shaped rod extending downwardly from the base member with the ends of the rod being attached to the base member. A portion of the V-shaped rod immediately adjacent its apex is bent at a right angle to the V-shaped rod to define a short horizontally extending slot from which the suspension members of clothes hangers can be suspended. The portions of the rod forming the horizontal slot and extending a short distance above the slot are parallel. These vertical parallel portions of the V-shaped rod necessitate raising the hanger a greater distance to release the suspension member from the slot. This is a considerable advantage since if the hanger is bumped while suspended from this suspension device it is not dislodged as easily when the suspension member must be raised above this vertical section in order to release the hanger.

Figure 19:
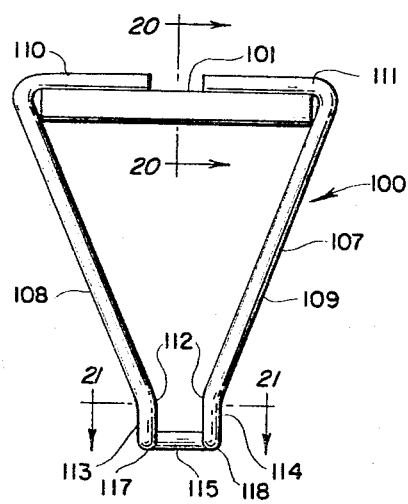
FIGURE 19 is a front elevational view of a modified clothes hanger suspension device wherein the lower portions of the V-shaped rod are parallel adjacent the horizontally extending slot.
Figure 20:
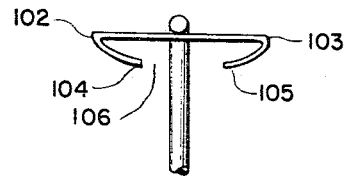
FIGURE 20 is a sectional view taken along the line 20—20 of FIGURE 19.
Figure 21:
FIGURE 21 is a sectional view taken along the line 21—21 of FIGURE 19.

As may be seen in FIGURE 19 there is illustrated a modified suspension device indicated generally at 100 and comprising a base member 101 formed of a rectangular piece of metal, plastic or other suitable sheet material with the opposed edges thereof being bent inwardly at 102 and 103 to form spaced apart channels with the terminal edges 104 and 105 of the channels defining therebetween a slot indicated at 106. The slot 106 receives the track portions 30 of the bar 27 as shown in FIGURES 2 and 9.

In order to form a support for the suspension member of a clothes hanger a rod-like member 107 is bent into the shape of a V with converging legs 108 and 109 with the upper ends of the legs being bent over at 110 and 111 and welded to the top surface of base member 101.

The legs 108 and 109 extend downwardly from the base member 101 and converge downwardly therefrom. The lower portions of the legs 108 and 109 converge to point 112 and then form parallel portions 113 and 114 which are connected at the rounded apex 115 of the V-shaped rod-like member. The parallel portions 113 and 114 are bent at a right angle to legs 108 and 109 to form a short horizontally extending slot 116.

As apparent from FIGURE 19 the slot 116 extends rearwardly of the suspension device so that the slot is open to the front thereof. It is pointed out that the sides of the horizontal slot 116 are also parallel for a short distance as may be seen in FIGURE 21.

The bends in the parallel portions 113 and 114 are indicated at 117 and 118 respectively and it can be seen that the legs 108 and 109 converge to points 112 which are located a short distance above the right angle bends 117 and 118.

Figure 22:
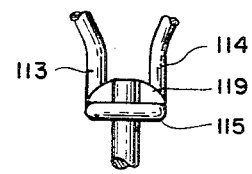
FIGURE 22 is a rear elevational view of the lower portion of the suspension device of FIGURE 19 and showing a T-head suspended therefrom.
Figure 23:
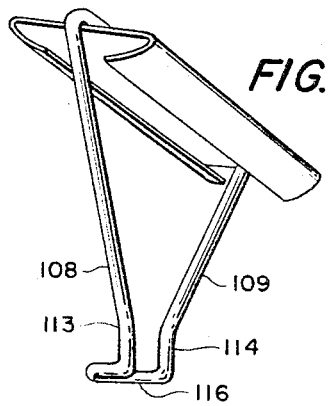
FIGURE 23 is a perspective view looking upwardly at the modified suspension device of FIGURE 19.

In FIGURE 22 there is shown a T-head suspension member 119 of a clothes hanger supported in the slot 116. It can be seen that the vertical parallel sections 113 and 114 prevent turning of the T-head and accordingly holds the T-head more securely in position.

Further in order to release the T-head 119 from the suspension device it is necessary to raise the hanger a sufficient height to clear the parallel portions 113 and 114. This height is considerably greater than the height required to raise the hanger to release the same from the suspension device illustrated in FIGURES 4 and 5.

Figure 24:
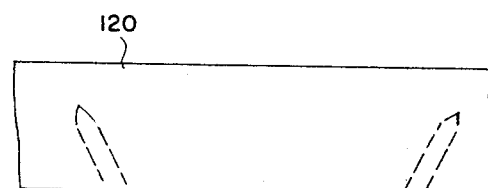
FIGURE 24 is a front elevational view of the modified suspension device of FIGURE 19 but showing the device secured to a stationary support.

While this modified suspension device has been described in connection with a base member adapted for sliding movement in a track, the suspension device can also be fixedly attached to a supporting structure such as indicated at 120 in FIGURE 24. Such a supporting structure may comprise a horizontally disposed bar or some such similar member.

Figure 25:
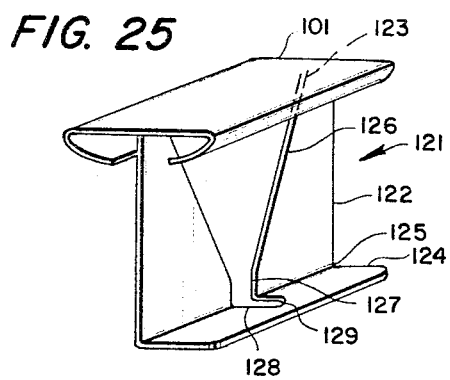
FIGURE 25 is a perspective view showing a further modification of the suspension device of FIGURE 19.
Figure 26:
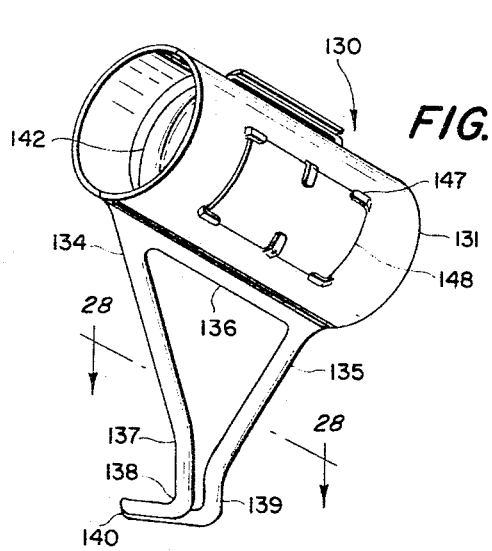
FIGURE 26 is a perspective view showing another modification of the suspension device.
Figure 27:
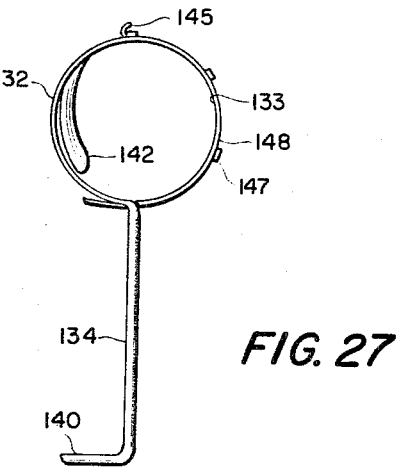
FIGURE 27 is a side elevational view of the suspension device illustrated in FIGURE 26.

Proceeding next to FIGURE 25 there is illustrated at 121 a suspension device similar to that of FIGURE 19 but formed from sheet material. This suspension device comprises a base member 101, similar to that illustrated in FIGURE 19, and a sheet member 122 having its upper edge 123 attached to the base member 101 and extending downwardly therefrom. The lower portion of the sheet 122, indicated at 124 is bent at a right angle at 125. A V-shaped slot 126 is formed in the vertical portion of sheet 122 with a slot 127 having parallel sides communicating with the lower or apex end of the slot 126. Further, a horizontally extending slot 128 is formed in the horizontal lower portion 124 with this slot 128 communicating with slot 127. The sides of slot 128 are parallel with the end of the slot being rounded as shown at 129.

It will be apparent that the structure of the suspension device in FIGURE 25 is similar to that of the suspension device in FIGURE 19 but that a sheet member is used to define the V-shaped slot instead of the rod-like member employed in FIGURE 19. The function of the V slot 126 is to serve as a guide for the end of the hanger hook when it is desired to suspend the hanger hook from horizontal slot 128. Also, the use of such a V-shaped guide slot facilitates the positioning of a T-head or ball stem within the horizontal slots 128.

With respect to the suspension device of FIGURE 25 it is also possible to form a plurality of such suspension devices by punching a plurality of slots such as 126, 127 and 128 in an elongated piece of sheet material 122. The sheet material may be metal, plastic, fiberboard or the like.

In FIGURES 26-29 there is illustrated still another modification of the suspension device which has a tubular base member and is formed of sheet metal. The modified suspension device is indicated generally at 130 and comprises a tubular cylindrical base member 131 formed from halves 132 and 133.

Formed integrally with the half 132 are converging legs 134 and 135 which have therebetween a base reinforcing member 136. Similar to the suspension device of FIGURE 19, the legs 134 and 135 converge to a point 137 and then form parallel portions 138 and 139 which are connected at the rounded apex 140 of the V-shaped rod-like member. The parallel portions 138 and 139 are bent at the right angle to legs 134 and 135 to form a short horizontally extending slot 141.

Figure 28:
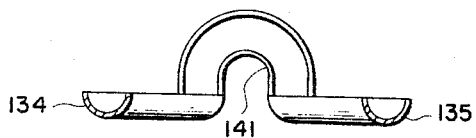
FIGURE 28 is a sectional view taken along the line 28—28 of FIGURE 26.

While this suspension device is described as being punched from sheet metal so that the V-shaped legs have a substantially U-shaped configuration as may be seen in FIGURE 28, it is pointed out that the legs may also be formed from wires or rods.

The pressure tab 142 is punched from tubular half 132 and is utilized to retain the suspension device in position on a hanger bar so that the device will not move too readily or rattle.

Figure 29:
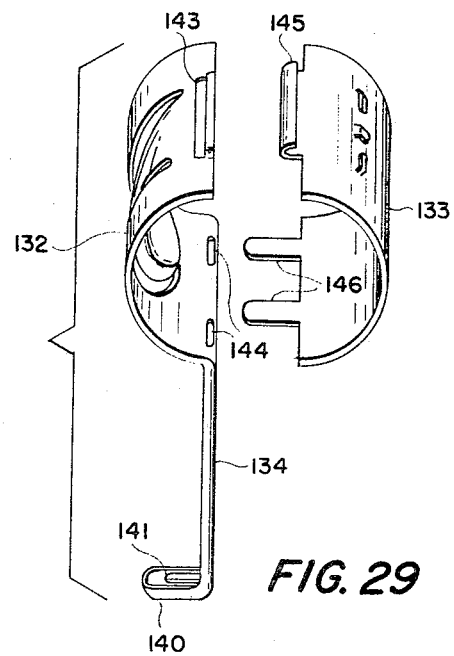
FIGURE 29 is an exploded perspective view of the device of FIGURE 26 showing the manner in which the halves are connected together.

It may be seen in FIGURE 29 tubular half 132 has a slot 143 adjacent its upper edge and a pair of slots 144 adjacent its lower edge.

Tubular half 133 has a hook-like portion 145 which hooks into slot 143 to form a hinge or pivot connection between the two halves 132 and 133. Along the bottom edge of half 133 are prongs 146 which are inserted into slots 144. These prongs 146 may be bent downwardly or given a slight twist to lock them in position after they have been inserted into these slots. Alternately, the prongs could be made a little wider so as to be tightly received in slots 144 and to be automatically locked in position.

The outer surface of half 133 may have a plurality of prongs 147 pressed outwardly therein so as to retain an identification card 148.

It is pointed out that the V-shaped legs of this modification may be shaped as illustrated in FIGURE 5 or in FIGURE 19.

In the installation of the wall rack of the present invention the wall brackets 2 are first mounted by the screws 6 on the wall in their approximate vertical positions. The slot 5 in which the screws 6 is received provides for a subsequent fine vertical adjustment of the wall brackets to insure that the bars 27 which define the shelf of the rack are substantially horizontal.

The spacing of the bars 27 with respect to each other and the distances of these bars from the wall is determined by selecting the openings 22 in the slide through which the bolts 31 are passed. When the bars 27 are mounted upon the slide the slide may then be positioned within the supporting brackets by slidable movement therein perpendicularly to the wall.

The end cap 36 is telescopingly positioned over the open end of the supporting bracket and positioned by screwing bolt 38. Thus these end caps remain in the same relative position with the shelf bars 27 so that when the racks are sighted linearly they all appear to be in alignment, particularly the outermost portions thereof which are the caps 36.

Thus, it can be seen that the present invention discloses a track and a slidably carried suspension device which can take any type of hanger on the market today, including the common hook, the ball-type head and the T-type head where the latter two are susally used on hangers to prevent their use except on special adapters attached permanently on hanger bars. No only can this suspension device support any type of clothes hanger, but the suspension device may be slidably mounted in a track or slidably mounted upon a hanger bar.

Various modifications of this suspension device provide for ready identification of garments suspended thereon or for the addition of hooks for supporting additional garments. The garment suspension arrangement disclosed herein may be used in connection with a wall-mounted rack or the track may be mounted by itself.

It will be understood that this invention is susceptible to modification in order to adapt it to different usages and conditions and accordingly, it is desired to comprehend such modifications within this invention as may fall within the scope of the appended claims.

What is claimed is:

1. A clothes hanger suspension device comprising a base member disposed in a substantially horizontal position, means extending downwardly from said base member for defining a V-shaped slot with the apex thereof being rounded and downwardly of said base member with the portion of said slot adjoining said apex having parallel sides, said means being bent at right angles to said V-shaped slot across the portion of the slot having parallel sides to form a short horizontal slot so that a clothes hanger having a suspension member including one of a hook, a T and an enlargement on the end of a stem can be suspended from said horizontal slot.

2. A clothes hanger suspension device as claimed in claim 1 with said means comprising a sheet-like member with the upper end being attached to said base member.

3. A clothes hanger suspension device as claimed in claim 1 with said base member being rectangularly shaped with the opposed longer edges being bent inwardly to form spaced apart channels with the terminal edges of said channels adapted to being slidably received in a track.

4. A clothes hanger suspension device as claimed in claim 1 with said means comprising a V-shaped rod with the ends thereof being attached to said base member.

5. A clothes hanger suspension device as claimed in claim 4 with the portion of said V-shaped rod adjoining the apex thereof being bent at right angles to define said slot.

6. A clothes hanger suspension device as claimed in claim 4 with said rod converging to a distance substantially equal to the width of said slot at a point above said bend whereby the portions of said rod forming said slot and extending above said bend are parallel.

7. A clothes hanger suspension device as claimed in claim 6 with the converging portions of said rod and the parallel portion of said rod above said bend being in the same plane.

8. A clothes hanger suspension device as claimed in claim 4 with said V-shaped rod comprising converging legs with the upper ends attached to said base member and the lower ends being parallel above and beyond said bend.

9. A clothes hanger suspension device comprising a base member disposed in a substantially horizontal position, a V-shaped rod with the ends thereof being attached to said base member and said V-shaped rod extending downwardly from said base member, a portion of said V-shaped rod adjoining its apex being bent at right angle to said rod to define a short horizontal slot so that a clothes hanger having a suspension member including one of a hook, a T and an enlargement on the end of a stem can be suspended from said slot, the portions of said rod forming said slot and extending above said bend being parallel.

10. A clothes hanger suspension device as claimed in claim 1 with said base member being tubular.

11. A clothes hanger suspension device as claimed in claim 10 with said tubular base member being cylindrical.

12. A clothes hanger suspension device as claimed in claim 10 with said tubular base member being adapted to be slidably mounted on a hanger bar passing therethrough, and means on said tubular base member for retaining said base member in position on a hanger bar.

13. A clothes hanger suspension device as claimed in claim 12 with said retaining means comprising a pressure tab in the wall of said tubular base member.

14. A clothes hanger suspension device as claimed in claim 10 and further comprising means on the exterior surface of said tubular base member for holding an identification card therein.

15. A clothes hanger suspension device as claimed in claim 10 with said tubular base member comprising two halves, and means for hingedly connecting said halves so that said tubular member may be readily mounted and removed from a hanger bar.

16. A clothes hanger suspension device as claimed in claim 15 with said halves being formed by a vertical plane passing along the central longitudinal axis of said tubular base member to define upper and lower halves edges, said hinge means being on said upper half edges, and means on said lower half edges for locking said halves together.

17. A clothes hanger suspension device comprising a tubular member adapted to be slidably mounted on a horizontal bar, a V-shaped rod with the ends thereof being attached to the exterior of said tubular member, the apex of said V-shaped rod being bent at right angles to said rod to define a slot so that a clothes hanger having a suspension member including one of a hook, a T and an enlargement on the end of a stem can be suspended from said slot.

18. A clothes hanger suspension device as claimed in claim 17 with the portions of the V-shaped rod adjoining said slot towards said tubular member being parallel.

19. A clothes hanger suspension device as claimed in claim 1 with said means comprising a V-shaped strip having a U shaped cross-section with the ends thereof being attached to said base member.

References Cited by the Examiner

UNITED STATES PATENTS

| | | | |
|---|---|---|---|
| 1,447,126 | 2/1923 | Dwyer | 16—87.2 |
| 2,585,500 | 2/1952 | Roy | 16—87.2 |
| 2,771,196 | 11/1956 | Scheuermann | 211—94 |
| 2,998,142 | 8/1961 | Reed | 211—113 |
| 3,288,308 | 11/1966 | Gingher | 211—123 |

CHANCELLOR E. HARRIS, *Primary Examiner.*

W. D. LOULAN, *Assistant Examiner.*